US 11,080,033 B2

(12) United States Patent
Kempf et al.

(10) Patent No.: US 11,080,033 B2
(45) Date of Patent: Aug. 3, 2021

(54) METHOD FOR INSTALLING A PROGRAM ON AN EMBEDDED SYSTEM, AN EMBEDDED SYSTEM FOR SUCH A METHOD, AND A METHOD FOR GENERATING ADDITIONAL INFORMATION

(71) Applicant: Endress+Hauser Conducta GmbH+Co. KG, Gerlingen (DE)

(72) Inventors: Stefan Kempf, Kornwestheim (DE); Stefan Robl, Hünxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/571,391

(22) Filed: Sep. 16, 2019

(65) Prior Publication Data

US 2020/0089482 A1    Mar. 19, 2020

(30) Foreign Application Priority Data

Sep. 19, 2018  (DE) .............. 10 2018 122 920.8

(51) Int. Cl.
*G06F 8/61*     (2018.01)
*G06F 8/75*     (2018.01)
*G06F 8/52*     (2018.01)

(52) U.S. Cl.
CPC ............ *G06F 8/61* (2013.01); *G06F 8/52* (2013.01); *G06F 8/75* (2013.01)

(58) Field of Classification Search
CPC .............. G06F 8/61; G06F 8/52; G06F 8/75
See application file for complete search history.

(56) References Cited

U.S. PATENT DOCUMENTS 6,948,164 B2 *  9/2005  Tinker ............... G06F 8/65
                                           717/163
6,983,460 B1 *  1/2006  Goire ............... G06F 9/445
                                           717/175
(Continued)

FOREIGN PATENT DOCUMENTS

TW          501043 B  * 10/2000  ......... G06F 19/00

OTHER PUBLICATIONS

Baiocchi et al., "Enabling Dynamic Binary Translation in Embedded Systems with Scratchpad Memory" (Year: 2012).*
(Continued)

*Primary Examiner* — Phillip H Nguyen
(74) *Attorney, Agent, or Firm* — Kelly J. Smith; Endress+Hauser (USA) Holding Inc.

(57) ABSTRACT

The present disclosure relates to a method for installing a program on an embedded system of process automation technology. The method includes steps of reading a first program code into a data memory of the embedded system via a data interface of the embedded system and reading additional information specific to the first program code into the data memory of the embedded system via the data interface. The method additionally includes a step of translating the first program code by means of the embedded system into a second program code executable by the embedded system. The program-specific additional information is used for the translation so that the second program code can be executed more efficiently by the embedded system than a third program code translated from the first program code without the program-specific additional information.

14 Claims, 2 Drawing Sheets

(56) References Cited

U.S. PATENT DOCUMENTS

| | | | | |
|---|---|---|---|---|
| 6,990,567 | B1* | 1/2006 | Cohen | G06F 9/30134 |
| | | | | 712/202 |
| 7,020,872 | B1* | 3/2006 | Goire | G06F 8/52 |
| | | | | 717/143 |
| 7,647,562 | B2* | 1/2010 | Ghercioiu | G06F 8/61 |
| | | | | 715/763 |
| 10,007,592 | B2* | 6/2018 | Bagchi | G06F 9/30098 |
| 10,203,942 | B2* | 2/2019 | Yang | G06F 8/4441 |
| 2003/0196187 | A1* | 10/2003 | Kodosky | G06F 9/44505 |
| | | | | 717/109 |
| 2004/0199897 | A1* | 10/2004 | Ghercioiu | G06F 8/61 |
| | | | | 717/101 |
| 2005/0003810 | A1* | 1/2005 | Chu | H04M 3/42178 |
| | | | | 455/418 |
| 2016/0321045 | A1* | 11/2016 | Radigan | G06F 8/47 |
| 2017/0149569 | A1* | 5/2017 | Prabhu | G06F 21/00 |
| 2017/0315755 | A1* | 11/2017 | Smith | G06F 3/064 |

OTHER PUBLICATIONS

Daud et al., "The Effects of Compiler Optimizations on Embedded System Power Consumption" (Year: 2008).*

Stefano et al., "Java Devices for Distributed Process Control" (Year: 2000).*

Mery et al., "Automatic Code Generation from Event-B Models" (Year: 2011).*

Baiocchi, José A., Childers, Bruce R., Davidson, Jack W. and Hiser, Jason D., Enabling Dynamic Binary Translation in Embedded Systems with Scratchpad Memory, ACM Transactions on Embedded Computing Systems, vol. 11, No. 4, Article 89, Dec. 2012, 33 pp.

Chernoff, Anton, Herdeg, Mark, Hookway, Ray, Reeve, Chris, Rubin, Norman, Tye, Tony, Yadavalli, S. Bharadwaj and Yates, John, FX!32, A Profile-Directed Binary Translator, IEEE Micro, Mar./Apr. 1998, pp. 56-64.

* cited by examiner

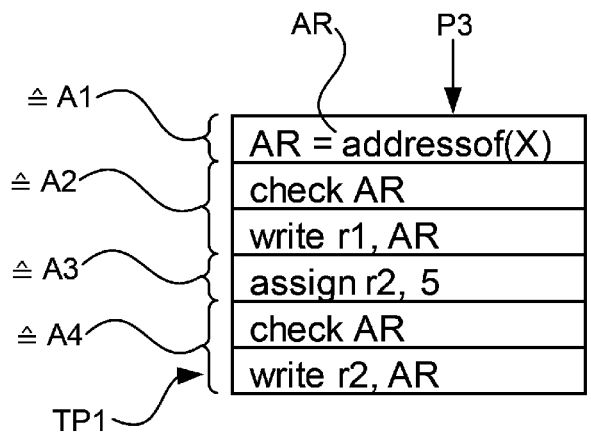
Fig. 2
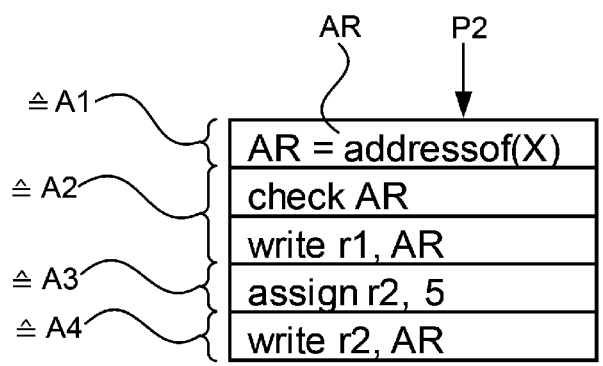
Fig. 3
| A1 | false |
|----|-------|
| A2 | false |
| A3 | false |
| A4 | true  |
Fig. 4
| A1 | AR = addressof(X) |
|----|-------------------|
| A2 | store r1, AR      |
| A3 | set r2, 5         |
| A4 | store r2, AR      |
Fig. 5

METHOD FOR INSTALLING A PROGRAM ON AN EMBEDDED SYSTEM, AN EMBEDDED SYSTEM FOR SUCH A METHOD, AND A METHOD FOR GENERATING ADDITIONAL INFORMATION

CROSS-REFERENCE TO RELATED APPLICATION

The present application is related to and claims the priority benefit of German Patent Application No. 10 2018 122 920.8, filed on Sep. 19, 2018, the entire contents of which are incorporated herein by reference.

TECHNICAL FIELD

The present disclosure relates to a method for installing a program on an embedded system of process automation technology, to an embedded system for such a method, and to a method for generating additional information.

BACKGROUND

In process automation technology, embedded systems, which are embedded in a field device, for example, are frequently used to execute process automation functions by means of a program. In order to execute the program, the embedded system reads the program code of the program and carries out the instructions given in the program code. However, one and the same program code is not directly transferable to any other embedded system without further processing, since not every embedded system can execute any program, as not every embedded system can read every program code. Thus it may happen that a user of a plurality of field devices requires an individual program code for each embedded system of the field device in question. This means that the different embedded systems of the field devices require different but semantically identical program codes tailored to the respective embedded system. However, in order to avoid redundant development work, different field devices which perform identical tasks should be controlled by an identical program code.

There are embedded systems that can translate a program not executable by the embedded system into a program executable by the embedded system. Binary translation is used as a method for the translation. Binary translation is a technique by which a program present in instruction set X is translated into an executable program having instruction set Y. An unoptimized binary translation can be understood as being a collection of rules, wherein for each instruction in instruction set X, there is a rule as to how this instruction in instruction set X is to be translated into a sequence of instructions in instruction set Y. The process of reading and translating a program into the embedded system is also termed installation of the program on the embedded system.

Furthermore, it is important for the user that the embedded system executes the program in the shortest possible runtime. In order to shorten the runtime of a program, the program has to be translated by a binary translation with optimizations. Expressed in abstract terms, optimizations are deviations from the rules of an unoptimized binary translation with the aim of a faster execution of the program translated in an optimized manner. Before an optimization is used, the program must be analyzed for its applicability during the translation in order to ensure that the optimized translation results in a result semantically identical to an unoptimized translation. However, such analyses require a high level of computing power and a large memory, which often exceeds the resources of an embedded system.

In addition, the user wants the embedded system to be as cost-effective as possible. This means that it should only have the resources absolutely necessary for fulfilling its task.

The user also wants the embedded system to have a computing unit with the lowest possible energy consumption in order to be able to operate in a field of application that prescribes special energy regulations for the devices operated in this field of application; or in order to work as long as possible with an independent power source. A potentially explosive atmosphere is, for example, a possible field of application with special energy regulations. Overall, this means that the embedded system should have only very limited computing and storage capacities.

SUMMARY

An object of the present disclosure is thus to provide a method for installing a program on an embedded system of process automation technology so that it can be read and executed by many different resource-limited embedded systems.

The present disclosure relates to a method for installing a program on an embedded system of process automation technology, including steps of reading a first program code into a data memory of the embedded system via a data interface of the embedded system, and reading additional information specific to the first program code into the data memory of the embedded system via the data interface. The method also includes a step of translating the first program code by means of the embedded system into a second program code executable by the embedded system. The program-specific additional information is used for the translation so that the second program code can be executed more efficiently by the embedded system than a third program code translated from the first program code without the program-specific additional information.

The subject-matter of the present disclosure has several advantages, some advantages being mentioned below by way of example. By reading additional information specific to the first program code, the first program code does not need to be checked for optimization possibilities by the embedded system but can be translated in an optimized manner by the embedded system as a result of the additional information, since the information and optimization instructions relevant for optimization are provided to the embedded system with the additional information. The method according to the present disclosure is thus suitable for being executed for an optimized translation by an embedded system having a computing unit which has a low computing power, a small random access memory and thus a low energy consumption. The first program code can thus be used for a plurality of embedded systems following a translation into a second program code executable by the respective embedded system.

In one embodiment, the program-specific additional information comprises at least one address of the first program code and at least one optimization instruction assigned to the address. The address is suitable for identifying a part of the first program code by the address, and the optimization instruction is suitable for translating the part in an optimized manner by means of the embedded system.

According to one embodiment, the address corresponds to a line of the first program code, or the address corresponds to a plurality of lines of the first program code.

According to one embodiment, the optimization instruction is suitable for the part of the first program code identified by the address not being translated, the part of the first program code identified by the address being only partially translated, the part identified by the address being divided into a plurality of parts and these parts being translated separately, and the parts of the first program code identified by the address being combined into one part and this part being translated.

According to one embodiment, the first program code and the specific additional information are read via a network connection or a memory card interface as a data interface.

According to one embodiment, the translation of the first program code is a binary translation.

The present disclosure further relates to a method for generating the additional information according to the present disclosure for a first program code by means of a non-embedded system, comprising a step of analyzing the first program code by a computing unit of the non-embedded system. The first program code is checked as to whether a part of the first program code identifiable by an address of the first program code can be optimized. The method also includes a step of generating the additional information with the address of the optimizable part and an optimization instruction assigned to the address, based on the analysis of the first program code on an embedded system. A second program code can be generated which can be executed more efficiently than a third program code translated from the first program code without the program-specific additional information.

According to one embodiment, during the analysis step, a check is made as to whether an instruction of the address of the first program code includes a memory access with memory address checking of an address register. A check is also made as to whether a memory access with memory address checking of the same address register has already taken place in the first program code, which memory access was carried out before the instruction of the address. A check is also made as to whether the contents of the address register remained unchanged by the previous memory access. If these conditions are met, the address of the first program code and an optimization instruction assigned to the address are written into the additional information so that the translated second program code does not contain a memory address check for the instruction translated at the address of the first program code.

According to one embodiment, the method comprises a step of analyzing a source code of the first program code after or during the analysis of the first program code.

According to one embodiment, the generation of the additional information is based on comments stored by the developer in the source code of the first program code.

According to one embodiment, the generation of the additional information is based on a result of a profiling run of the first program code.

The present disclosure furthermore relates to an embedded system of process automation technology, comprising a data interface, a data memory and a computing unit having a computing power of less than 32 MHz or less than 8 MHz, for example. The embedded system is suitable for carrying out the method according to the present disclosure for installing a program on an embedded system.

According to one embodiment, the data memory has a random access memory (RAM) of less than 256 kB or less than 128 kB, for example.

According to one embodiment, the data memory has a persistent memory (ROM) of less than 1024 kB or less than 512 kB, for example.

BRIEF DESCRIPTION OF THE DRAWINGS

The present disclosure is explained in more detail based on the following description of the figures. They show:

FIG. 2 shows an example of an unoptimized, translated third program code;

FIG. 3 shows an example of an optimized, translated second program code;

FIG. 4 shows an example of additional information with address specification and optimization instruction, and FIG. 5 shows an example of a first program code.

DETAILED DESCRIPTION

Figure 1:
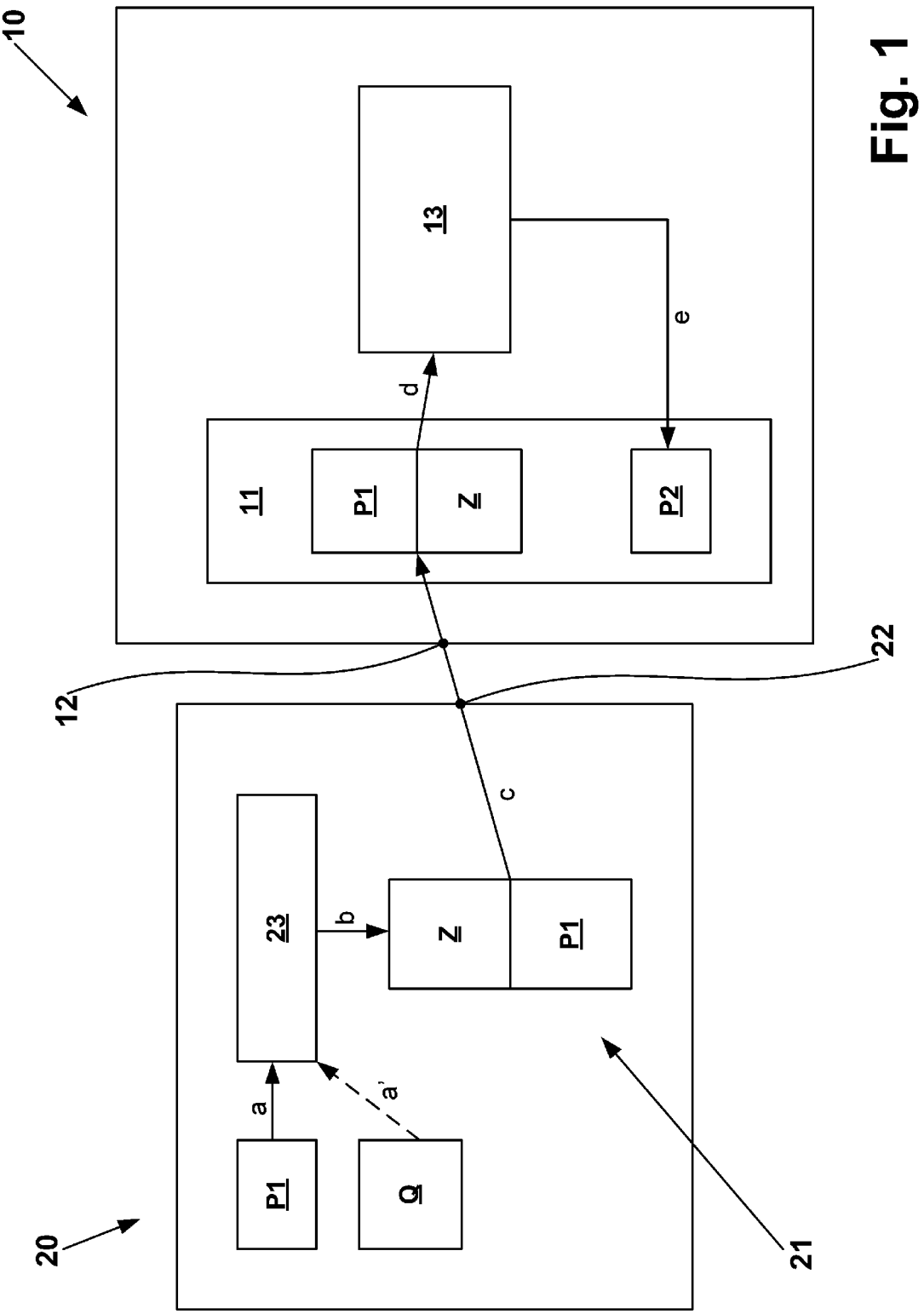
FIG. 1 shows a schematic representation of an external system and an embedded system.

FIG. 1 shows an embedded system 10 with a data memory 11, a data interface 12 and a computing unit 13. The embedded system 10 may be present in a field device in order to control the field device, for example in order to evaluate sensor data of the field device.

In order to control the field device, the embedded system 10 uses a program with a program code which is available to the embedded system 10 in the data memory 11. The embedded system 10 is suitable for receiving a first program code P1 and translating it into an optimized second program code P2 readable by the embedded system 10. This translation is a binary translation. The receiving and translating is termed installing the program. How this installation method proceeds in detail will be explained in more detail later.

The embedded system 10 may be powered by a power source that is external or internal to the field device.

The data memory 11 of the embedded system 20 is suitable for storing the first program code P1 and the second program code P2. In one embodiment, the data memory 11 comprises a persistent memory, also referred to as ROM, as well as a random access memory (RAM). The persistent memory has a maximum size of 1024 kB, preferably a maximum size of 512 kB, in order to guarantee a maximum energy-saving and at the same time optimal functionality of the embedded system. The random access memory has a maximum size of 256 kB, preferably a maximum size of 128 kB, in order to guarantee a maximum energy-saving and at the same time optimal functionality of the embedded system. The capacity of the persistent memory or random access memory can also be selected arbitrarily if permitted by the field of application of the embedded system.

The data interface 12 of the embedded system 20 may be formed by a cable interface, such as a USB interface or a LAN interface. Alternatively, the data interface 12 can also be formed by a wireless interface, for example a WLAN or a Bluetooth interface. The embedded system 10 is suitable for receiving the first program code P1 and additional information Z via the data interface 12. The additional information Z is suitable for being used by the embedded system 10 to translate the first program code P1 in an optimized manner. How the additional information Z comes about and how it is used in the translation will be explained in more detail later.

The lower the computing power of the computing unit 13 of the embedded system 20, the lower will be the energy consumption of the computing unit 13 and of the embedded system 10. As a result of a low energy consumption of the embedded system, the energy consumption of the field device is also low. This makes a field device with such an embedded system 10 particularly suitable for fields of application with special regulations with regard to the energy consumption of devices, for example potentially explosive atmospheres.

The computing unit 13 can be a processor with a computing power of at most 32 MHz, preferably at most 8 MHz, in order to guarantee a maximum energy-saving and at the same time optimal functionality of the embedded system. Depending on the field of application of the field device for which the embedded system 10 is intended, the computing unit 13 can be selected in such a way that the regulations for the energy consumption of the computing unit or of the field device of the field of application are complied with. The computing power of the computing unit 13 can also be selected arbitrarily if permitted by the field of application of the embedded system.

Furthermore, FIG. 1 shows a non-embedded system 20 with data memory 21, data interface 22 and computing unit 23. The non-embedded system 20 is a system separate from, i.e. independent of, the embedded system 10. For example, the non-embedded system 20 is locally separate from the embedded system 10. For example, the non-embedded system 20 is a PC or server.

The non-embedded system 20 is suitable for analyzing the first program code P1 and for generating additional information Z resulting from this analysis. Furthermore, the non-embedded system 20 is suitable for analyzing a source code Q which has the same program content as the first program code P1 since the first program code P1 arose from a compilation of the source code Q. The source code Q is easily readable by a user and may include comments from the developer of the program described by the source code Q. The non-embedded system 20 is suitable for also generating the additional information Z depending on the analysis of the first program code P1 and of the source code Q.

Thanks to the generation of the additional information Z on the non-embedded system 20, it is possible to realize the analysis of the first program code P1 once by the non-embedded system 20 and to subsequently provide a plurality of embedded systems with the same additional information Z for an optimized translation of the first program code P1 into a second program code P2 executable by the respective embedded system.

The data memory 21 of the non-embedded system 20 can have a capacity of any size, because the non-embedded system 20 is preferably spatially separated from the embedded system 10 and its field of application. The non-embedded system 20 is thus not subject to any power consumption regulations. The data memory 21 is formed, for example, by a persistent memory (ROM), a random access memory (RAM), or a hard disk of a PC or server.

The data interface 22 of the non-embedded system 20 may be identical to the above-described data interface 12 of the embedded system 10. The data interfaces 12, 22 of the systems 10, 20 are suitable for being connected to each other using communication technology. This connection can be established, for example, by a cable or a wireless connection of the interfaces. This makes possible the transmission of the first program code P1 and the additional information Z from the non-embedded system 20 to the embedded system 10.

The communication-technology-related connection between the non-embedded system 20 and the embedded system 10 may also be provided indirectly. This means that the non-embedded system 20 transmits the first program code P1 and the additional information Z to a separate data carrier via the data interface 22. The separate data carrier is subsequently connected to the embedded system 10 via the data interface 12 in order to transmit the first program code P1 and the additional information Z of the separate data carrier to the respective embedded system 10.

The computing unit 23 of the non-embedded system 20 can have a capacity of any size, because, as described above, the non-embedded system 20 is preferably spatially separated from the field of application of the embedded system 10 and the power consumption regulations there. The computing unit 23 can be formed, for example, by a processor or by a plurality of processors of a PC or server.

The method for installing a program on the embedded system 10 is described below. FIG. 1 shows, with the aid of arrows, various method steps relating to the embedded system 10 and the non-embedded system 20.

In the context of this present disclosure, a method for installing a program is understood to be a method for preparing a native execution of a program. A native execution of a program is understood to mean an execution of a program which has been specifically translated for execution in the target environment or in the embedded system. This means that a native program is present in a machine code or program code executable by the target environment and can thus be executed directly by the processor or the computing unit of the target environment, i.e., the embedded system.

In the context of this present disclosure, an optimized program code is a program code which was optimized during its translation into a program code executable by the target environment or the embedded system.

For installation of a program on the embedded system 10 of process automation technology, the first program code P1 is first read into, i.e. stored in, the data memory 11 of the embedded system 10 via the data interface 12 of the embedded system 10 as shown in FIG. 1 by arrow c. The reading can be done via a cable connection, for example a USB cable or a LAN cable, or a wireless connection, for example a WLAN connection or a Bluetooth connection, between the data interface 22 of the non-embedded system 20 and the data interface 12 of the embedded system 10. In one embodiment, the first program code P1 and the additional information Z may also be transmitted indirectly between the data interfaces 12, 20 by means of a separate data carrier, for example a USB stick or a memory card.

The additional information Z is subsequently read into the data memory 11 of the embedded system 10 via the data interface 12 (see FIG. 1, arrow c). The additional information Z relates to the first program code P1. Alternatively, the additional information Z can also be read into the data memory 11 at the same time as the first program code P1.

The first program code P1 is subsequently translated by the embedded system 10 using the additional information Z into a second program code P2 executable by the embedded system 10 (see FIG. 1, arrows d and e). The translation is a binary translation. The arrow d in FIG. 1 shows that, for the purpose of translation, the computing unit 13 reads the first program code P1 and the additional information Z from the data memory 11. An optimized second program code P2 is then generated by the computing unit 13 using the additional information Z and written into the data memory 11. The second program code P2 can be executed more efficiently by the embedded system 10 than a third program code P3 translated, also by binary translation, from the first program code P1 without the program-specific additional information Z. In this context, more efficiently means a faster execution on the embedded system 10 of the program described by the program code.

During translation, the program-specific additional information Z is read by the embedded system 10 in such a way that at least one address A of the first program code P1 and at least one optimization instruction H assigned to address A is identified in the additional information Z. When translating the first program code P1 into the second program code P2, it is thus possible for a part TP1 of the first program code P1 identified by address A to be translated while taking into consideration the assigned optimization instruction H.

The optimization instruction H enables an optimized translation of the part TP1 of the first program code P1 indicated by address A. The optimization instruction H can be of the boolean or integer or character data types or another, possibly a combined data type.

The address A corresponds, for example, to a line of the first program code P1. The address A may also correspond to a plurality of lines of the first program code P1. The address A is used for identifying the part TP1 of the first program code P1.

Complying with the optimization instruction H when translating the part TP1 of the first program P1 identified by address A causes the part TP1 of the first program P1 identified by address A to not be translated, or the part TP1 identified by address A to be partially translated, or the part TP1 identified by address A to be divided into several parts and translated separately, or the parts of the first program code P1 identified by address A to be combined into one part and translated. Complying with the optimization instruction H when the first program code P1 is translated by the embedded system 10 can also bring about further optimizations.

An example of an optimization is the non-translation of a redundant part TP1 of the first program code P1, as shown in FIGS. 2 to 5.

FIG. 2 shows a third program code P3 which has been translated from the first program code P1 without the additional information Z. As indicated in FIG. 2 by the "corresponds to" character, the first line of the third program code P3 corresponds to the part of the first program code P1 identified by address A1. The second line and third line of P3 correspond to the part of the first program code P1 identified by address A2. The fourth line of P3 corresponds to the part of the first program code P1 identified by address A3. The fifth line and sixth line of P3 correspond to the part of the first program code P1 identified by address A4. In the second line and in the fifth line of the third program code P3, there is in each case an instruction "check AR" for a memory address check, wherein the instruction in the fifth line of the third program code P3 is redundant. Such redundancy results in runtime losses during execution by the embedded system 10.

FIG. 3 shows a second program code P2 which has been translated from the first program code P1 with the additional information Z. As shown in FIG. 3 by the "corresponds to" character, the first line of the second program code P2 corresponds to the part of the first program code P1 identified by address A1. The second line and third line of P2 correspond to the part of the first program code P1 identified by address A2. The fourth line of P2 corresponds to the part of the first program code P1 identified by address A3. The fifth line of P2 corresponds to the part of the first program code P1 identified by address A4. In the second program code P2, no redundant instruction for a memory address check can be seen (see line five of P2 in FIG. 3). When executed by the embedded system 10, such a program code results in a faster runtime in comparison to the third program code P3.

FIG. 4 shows exemplary additional information Z with a plurality of addresses A1-A4 and optimization instructions H assigned to the addresses. The additional information was generated by analyzing the first program code P1 in FIG. 5.

The example assumes that instruction set P1 has the memory access instructions "store" which first check the validity of the memory address by means of a memory address check (see instruction of address A2 in FIG. 5). For the instruction set of the programs P3 and P2 from FIGS. 2 and 3, the example assumes that the memory access instructions "write" (see FIGS. 2 and 3) do not perform a memory address check and that a separate instruction "check" (see FIGS. 2 and 3) must therefore generally be placed in front of them during the translation. During the translation of the first program code P1, the embedded system 10 checks with a check question for each instruction of the first program code P1 to be translated whether it can be translated into instructions of the second program code P2 without memory address checking. The check question is asked on the embedded system 10 during binary translation. The additional information Z is thus accessed by the embedded system 10 during binary translation in order to answer the check question. In an embodiment not shown, the additional information Z may also contain the check questions.

As can be seen in FIG. 4, the optimization instruction H contained in the additional information Z and assigned to address A4 is "true". The answer to the check question is thus that the part of the first program code P1 identified by address A4 can be translated into the second program code P2 without memory address checking. As can be seen from FIG. 3, the result for the optimized second program code P2 is that an instruction "check" is no longer placed in front of the part assigned to address A4. In contrast, the non-optimized third program code P3 has the instruction "check" in the part assigned to address A4.

In FIG. 4, the instructions assigned to addresses A1-A3 are "false". If memory access instructions are located at addresses A1-A3 in the first program code P1, they will be translated into the second program code P2 with memory address checking.

The additional information may include any instruction that contributes to an optimized translation of the first program code P1.

As mentioned above, the optimization instruction H may cause the part TP1 identified by address A to be only partially translated. For example, the part TP1 could consist of only a single instruction of an instruction chain of the first program code P1. For example, the first program code P1 could contain an instruction chain which includes a division and which at the same time also always calculates the remainder of the division. However, if the remainder of the division is not used in the first program code P1, the additional information Z can contain an optimization instruction H so that generating the unnecessary instruction for the calculation of the remainder is dispensed with when the instruction chain is translated. Thus, when the second program code P2 is executed by the embedded system, no unnecessary remainder calculation is performed, resulting in a faster runtime in comparison to an unoptimized third program code P3.

As mentioned above, the additional information Z may contain an optimization instruction H so that the part TP1 identified by address A is divided into a plurality of parts and these parts are translated separately.

As mentioned above, the optimization instruction H can cause the parts of the first program code P1 identified by address A to be combined into one part and to be translated.

An optimization instruction H could be based on a fused multiply-add operation, i.e., an instruction which performs a multiplication followed by an addition in a single step.

If the first program code P1 contains a multiplication at address A followed by an addition to the result of the previous multiplication, an optimization instruction H could be recorded in the additional information Z so that these two instructions are translated together into a fused multiply-add operation in the optimized second program code P2. This leads to a shorter runtime when the second program code P2 is executed by the embedded system 10.

The optimization instruction H may also code a plurality of optimization possibilities, of which the embedded system applies a subset of the optimizations applicable to this embedded system 10. For example, if an embedded system 10 does not support the fused multiply-add operation mentioned above, this embedded system will ignore this optimization possibility.

Many other optimization instructions are possible. However, all conceivable optimization instructions cannot possibly be listed here.

The method for generating the additional information Z by the non-embedded system 20 is described below.

The non-embedded system 20 analyzes the first program code P1 by means of the computing unit 23. As shown in FIG. 1 by the arrow a, the first program code P1 is read and checked by the computing unit 23 as to whether a part TP1 identified by address A of the first program code P1 can be optimized. The computing unit 23 can also analyze a source code Q, which corresponds in terms of content to the first program code P1 and is easily human-readable, in order to generate at least parts of the additional information Z (see FIG. 1, arrow a'). Comments by the developer of the program can be stored in the source code Q, which comments the computing unit 23 can use when analyzing the first program code P1 and the source code Q in order to recognize optimizations and to record them in the additional information Z (see FIG. 1, arrow b).

The presence and analysis of the source code Q is optional, which is indicated in FIG. 1 by dashed arrow a'.

As shown in FIG. 1 by arrow b, the additional information Z with address A of the optimizable part TP1 and an optimization instruction H assigned to address A are subsequently generated by the non-embedded system 20 based on the analysis of the first program code P1. Thus, when translating using the additional information Z of the first program code P1 on an embedded system, a second program code P2 can be generated which can be executed more efficiently than a third program code P3 translated from the first program code P1 without the program-specific additional information Z.

If a part TP1 to be optimized is recognized in the first program code P1, then address A of the part TP1 and the optimization instruction H, which enables the optimization of the part TP1, will be used to generate the additional information Z.

Thanks to the analysis of the first program code P1 and/or of the source code Q, for example, an unnecessary memory address check for an address register in a part TP1 of the first program code P1 which is identifiable with an address A can be identified and an optimization instruction H can be generated in order to avoid this memory address check when executing the second program code P2. The additional information Z comprises address A and optimization instruction H.

The analysis of the first program code P1 may also include, for example, that for an optimized translation of the first program code P1, a part TP1 of the first program code P1 will have to be divided into a plurality of parts and translated separately. In this case, the corresponding additional information Z includes an address specification A in order to identify the part TP1 of the program code P1 and an optimization instruction H assigned to the address specification with a corresponding instruction for dividing the identified parts and for separate translation.

The analysis of the first program code P1 may also include, for example, that for an optimized translation of the first program code P1, a part TP1 of the program code P1 will have to be combined. In this case, the corresponding additional information Z includes an address specification A in order to identify the part TP1 of the program code P1 and an optimization instruction H assigned to the address specification with a corresponding instruction for combining the identified parts.

The analysis of the first program code P1 may also include, for example, that for an optimized translation of the first program code P1, a part TP1 of the first program code P1 will not have to be translated.

This is the case, for example, with a redundant memory address check, which can be identified as follows in the analysis of the first program code P1 by the computing unit 23. During the analysis of the first program code P1, a check is made as to whether the instruction of address A of the first program code P1 includes a memory access with memory address checking to an address register AR and whether a checked memory access to the same address register AR had already taken place in the first program code P1 and was definitely executed before the instruction at address A (in the terminology of compiler construction: the previous instruction dominates the instruction at address A) and whether the content of address register AR remained unchanged by the previous memory access, wherein, if these conditions are fulfilled, address A of the first program code P1 and an optimization instruction H assigned to address A will be written into the additional information Z so that the translated second program code P2 contains no memory address check for the instruction translated at address A of the first program code P1.

The generation of the additional information Z can also be based on a result of a profiling run of the first program code P1. This means that, when analyzing the first program code P1, runtime information of the various parts of the first program code P1 is additionally used. Runtime information includes, for example, frequencies as to how often an instruction has been executed in program code P1. For example, instructions of the first program code P1 which are frequently executed are examined for optimizations with more analysis effort.

Countless further checks of the first program code P1 are also conceivable, which can be used to generate the additional information Z for optimizing the translation of the first program code P1. For example, known analyses from the compiler construction are conceivable here, which are used in compilers for the purpose of optimization. Thanks to the optimization instructions H provided by the additional information Z, a resource-limited embedded system can use the optimization instructions H in order to translate a first program P1 into an optimized second program P2 with little computing and storage expenditure.

The invention claimed is:

1. A method for installing a program on an embedded system of process automation technology, including at least the steps of:

reading a first program code into a data memory of the embedded system via a data interface of the embedded system, reading additional information specific to the first program code into the data memory of the embedded system via the data interface, translating the first program code by means of the embedded system into a second program code executable by the embedded system, wherein the program-specific additional information is used for the translation so that the second program code can be executed more efficiently by the embedded system than a third program code translated from the first program code without the program-specific additional information.

2. The method of claim 1, wherein the program-specific additional information includes at least one address of the first program code and at least one optimization instruction assigned to the address, wherein the address identifies a part of the first program code, and the optimization instruction translates the part in an optimized manner using the embedded system.

3. The method of claim 2, wherein the address corresponds to a line of the first program code or to a plurality of lines of the first program code.

4. The method of claim 2, wherein the optimization instruction translates at least one of:
the part of the first program code identified by the address not being translated,
the part of the first program code identified by the address being only partially translated,
the part identified by address being divided into a plurality of parts and the parts being translated separately, and
the parts of the first program code identified by the address being combined into one part and this part being translated.

5. The method of claim 1, wherein the reading of the first program code and of the specific additional information takes place via a network connection or a memory card interface as a data interface.

6. The method of claim 1, wherein the translation of the first program code is a binary translation.

7. The method of claim 1, further including a step of generating the additional information for the first program code using a non-embedded system, wherein the generating step includes steps of:
analyzing the first program code by means of a computing unit of the non-embedded system, wherein the first program code is checked as to whether a part of the first program code identifiable by an address of the first program code can be optimized, and
generating the additional information with the address of the optimizable part and an optimization instruction assigned to the address based on the analysis of the first program code so that the second program code can be generated on an embedded system during translation using the additional information of the first program code, which second program code can be executed more efficiently than the third program code translated from the first program code without the program-specific additional information.

8. The method of claim 7, wherein the analyzing step includes determining:
whether an instruction at the address of the first program code includes a memory access with memory address checking of an address register,
whether the memory access with memory address checking of the same address register has already taken place in the first program code and was definitely before the instruction of the address, and
whether the contents of the address register remained unchanged by the previous memory access;
wherein, when these conditions are fulfilled, the address of the first program code and an optimization instruction assigned to the address are written into the additional information so that the translated second program code contains no memory address check for the instruction translated at the address of the first program code.

9. The method of claim 8, wherein the method includes a step of analyzing a source code of the first program code after or during the analysis of the first program code.

10. The method of claim 9, wherein generating the additional information is based on comments stored by the developer in the source code of the first program code.

11. The method of claim 9 wherein the generation of the additional information is based on a result of a profiling run of the first program code.

12. An embedded system of process automation technology, including:
a data interface,
a data memory, and
a computing unit with computing power of less than or equal to 32 MHz, the embedded system configured to:
read a first program code into a data memory of the embedded system via a data interface of the embedded system,
read additional information specific to the first program code into the data memory of the embedded system via the data interface,
translate the first program code by means of the embedded system into a second program code executable by the embedded system,
wherein the program-specific additional information is used for the translation so that the second program code can be executed more efficiently by the embedded system than a third program code translated from the first program code without the program-specific additional information.

13. The embedded system of claim 12, wherein the data memory has a random access memory of less than or equal to 256 kB.

14. The embedded system of claim according to claim 12, wherein the data memory has a persistent memory of less than or equal to 1024 kB.

* * * * *